Patented May 11, 1948

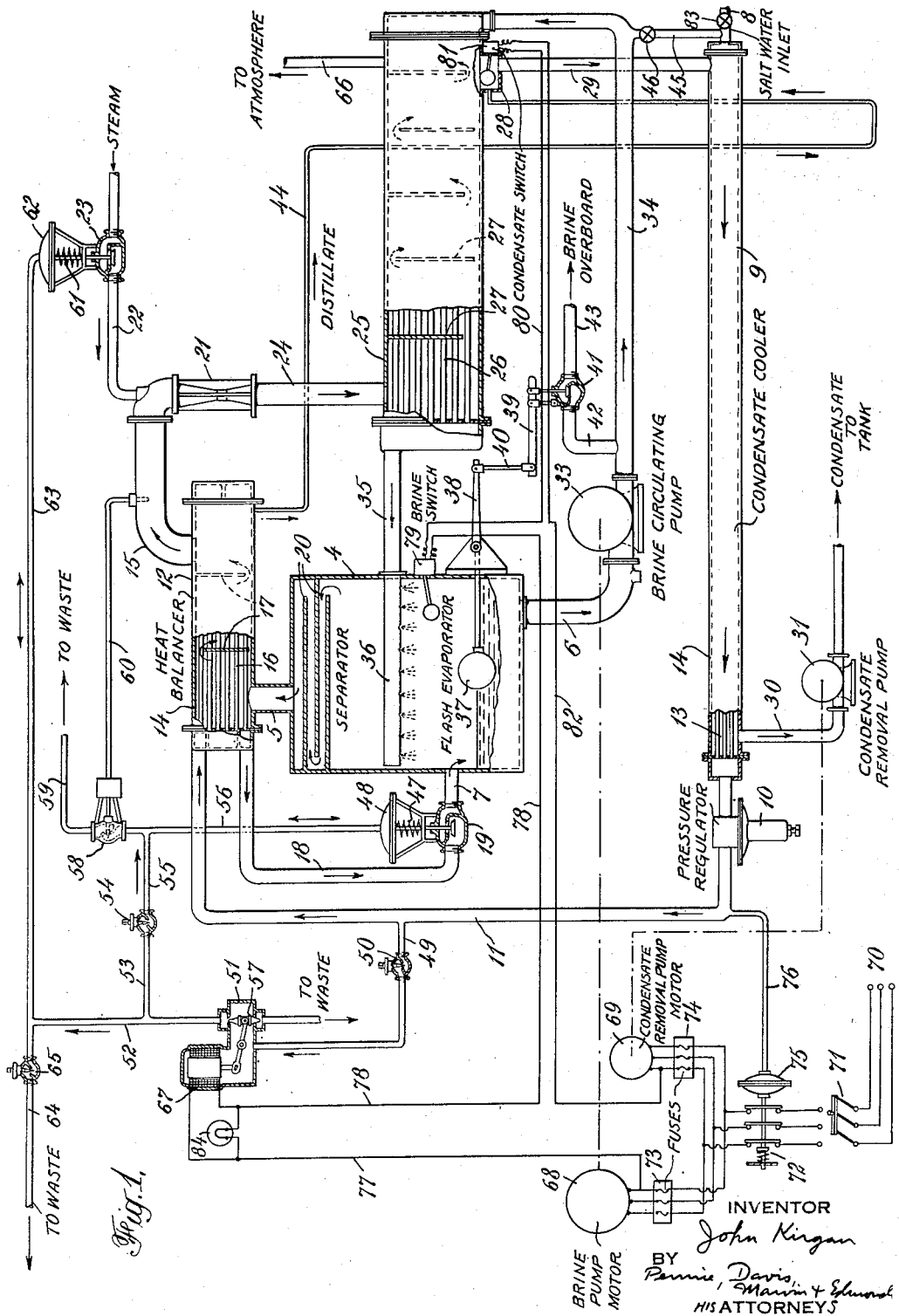

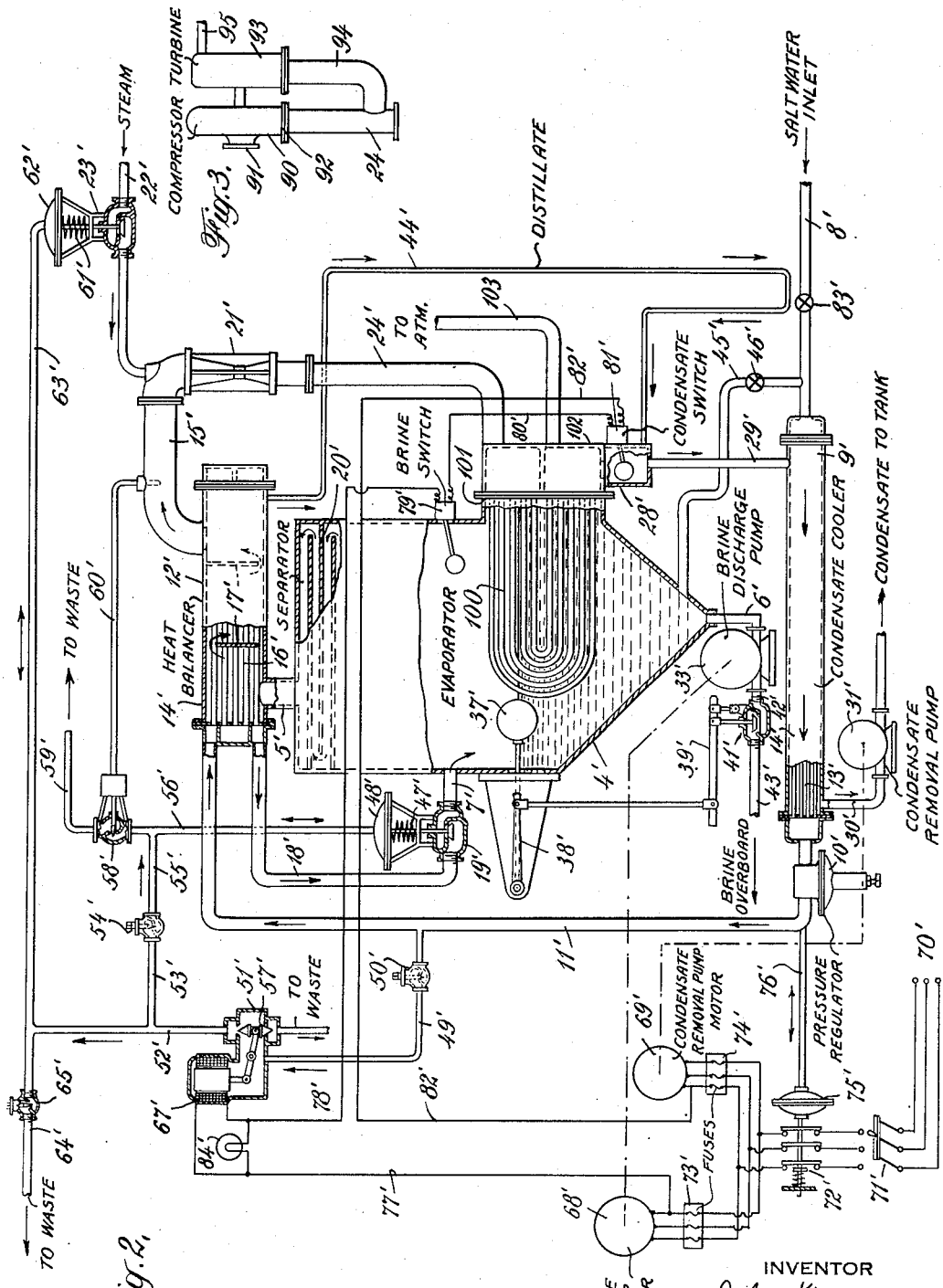

2,441,361

UNITED STATES PATENT OFFICE 2,441,361

VAPOR COMPRESSION STILL WITH LIQUID LEVEL CUTOFF

John Kirgan, Elizabeth, N. J.

Application March 27, 1945, Serial No. 585,126

7 Claims. (Cl. 202—181)

This invention relates to evaporation and more particularly concerns an improved method of evaporating and recovering liquid from a solution and improved apparatus for carrying out this method.

It is desirable in many operations to evaporate liquid from a solution. Such evaporation may be for the purpose of obtaining a solution of higher solute concentration or to recover liquid from the solution in a purified state or for both such purposes. As an example in which the process is used to recover purified liquid, ships operating in salt water require a supply of fresh water for use as boiler make-up water or for drinking purposes or both, and such fresh water is obtained by evaporating sea water and condensing the vapor therefrom. Evaporating and distilling apparatus for this and like purposes should preferably operate continuously and efficiently over long periods with a minimum of attention and maintenance.

Presently available equipment of the type described is unsatisfactory in certain respects. The operation of such equipment is altered by changes in the temperature of the sea water or other solution treated, by variations in operating steam pressure and by other factors necessarily present in most installations and particularly in marine use. The accumulation of salt in the apparatus reduces the efficiency of its operation and necessitates shutdowns for cleaning purposes with a resultant drop in the amount of condensate produced. Under certain conditions of operation, known apparatus may flood or prime and as a consequence a certain amount of salt water is carried over into the condensate output. Constant skilled attention and adjustment is required to maintain the efficiency and output of known equipment of this type at satisfactory levels, and lack of such attention and adjustment frequently results in flooding, priming or other failures or breakdowns which are a serious hazard, particularly in shipboard installations where the evaporating equipment is the only source of fresh water available.

With the above and other condensations in mind, it is proposed in accordance with the present invention to provide an improved method of and apparatus for evaporating solutions such as sea water and recovering fresh water from the vapor so produced. The invention contemplates an evaporation method and apparatus which operates continuously at high efficiency and productive capacity without any adjustment or attention except that required to start the operation and to shut it down. In accordance with the invention, the operation is maintained stable and efficient despite changes in feed solution temperature, and other variable factors. The apparatus of the invention preferably incorporates improved protective devices so coordinated and interrelated that failures of operating steam supply, electric power or solution supply or withdrawal do not result in flooding, damage, or other impairment of the equipment.

In general, the invention involves the evaporation of vapor from a substantially constant quantity of a solution such as sea water under a controlled absolute pressure, which may be below atmospheric pressure. The evaporating pressure is maintained by withdrawing vapor evolved from the solution and compressing it, the compressed vapor being employed to supply heat to vaporize the solution. This heat interchange results in the condensation of the withdrawn vapor. The vapor withdrawn from the evaporator is preferably compressed by the action of a heated fluid such as steam, and the exhaust steam from this operation is preferably mingled with the compressed vapor and employed to heat the solution under evaporation, the exhaust steam being condensed with the compressed vapor in this operation.

The solution is fed to and bled from a body of solution in the evaporator vessel so that the concentrated solution is withdrawn substantially continuously, and the accumulation of salt or other solute in the evaporator is avoided. The amount of heat directly supplied to the evaporating solution by the compressed vapor and the exhaust steam where steam is used to compress the vapor is normally more than is required to maintain vaporization at the rate vapor is withdrawn by the compressor. This excess of supplied heat is delivered to the solution being supplied to the evaporator. This is preferably accomplished by condensing a part of the vapor evolved in the evaporator before it is compressed, by heat exchange with the relatively cold solution being fed into the evaporator. The amount of vapor so condensed is controlled in accordance with the absolute pressure in the evaporator, preferably by varying the rate of feed of solution through the heat exchange means to the evaporator directly in accordance with changes in the absolute pressure of the vapor in the evaporator or in accordance with temperature changes corresponding to such pressure changes. With this arrangement, the evaporating pressure is maintained substantially constant at a value which may be so chosen as to provide efficient and economical operation of the vapor compressing apparatus. With the described arrangement, variations in the temperature of the solution fed to the apparatus are compensated for by variations in the rate of flow of solution therethrough, and a balance of heat input to and heat output from the evaporating and condensing equipment is maintained. Thus when the temperature of the feed solution rises so as to more closely approach the evaporating temperature, the rate of feed of the solution is increased, whereas a drop in feed solution temperature results in a lowered rate of solution feed.

A preferred form of the invention includes a condenser or heat exchanger, which may also be termed a heat balancer, which condenses a part of the uncompressed vapor evolved in the evaporator by heat exchange with the relatively cold solution fed to the evaporator. The condensate resulting from this operation together with that resulting from condensation of the compressed vapor and the exhaust steam from the vapor compressing apparatus constitutes the condensate output of the equipment.

In a preferred form of the invention, a steam jet evacuator or thermal compressor is employed to withdraw vapor from the evaporator and compress it. Mechanical compressors might be used for this purpose, but the steam jet type is preferable because it is efficient and reliable and requires little or no maintenance over extended periods of operation. The amount of vapor propelled by a steam jet evacuator in relation to the amount of motive steam consumed varies with the suction pressure, and since the absolute pressure in the evaporator of my system is maintained substantially constant in the manner described, the steam jet device may be employed to withdraw and compress the vapor in a highly efficient and economical manner.

In one form of the invention, the solution is maintained under pressure while heat is delivered thereto from the compressed vapor and exhaust steam, and the heated solution is flashed in the evaporator, the heat balance being maintained in the manner described above. This arrangement prevents ebullition of the solution in contact with heating surfaces, and so minimizes or eliminates the accumulation of salt deposits in the apparatus.

In describing the invention in detail, reference will be made to the accompanying drawings in which typical apparatus embodying the invention and capable of performing the improved method has been diagrammatically illustrated. In the drawings:

Fig. 1 is a diagrammatic and simplified representation of a solution evaporating system embodying the invention and capable of carrying out the method of the invention;

Fig. 2 is a diagrammatic and simplified representation of a modified form of solution evaporating system embodying the invention; and Fig. 3 is a diagrammatic elevation of a vapor compressor and driving means therefor which can be employed in the embodiments of Figs. 1 or 2 in place of the steam jet evacuators or thermal compressors there illustrated.

The invention will be described in connection with systems for use in evaporating and condensing brine such as sea water to produce fresh water for use on shipboard. The invention is obviously not limited to this application but is useful in any operation involving evaporation of water or other liquid from a solution.

Referring to the system illustrated in Fig. 1, it includes an evaporator 4 comprising a closed vessel of any suitable shape having a vapor outlet duct 5 connected through its top wall and a solution outlet pipe 6 connected to its bottom wall. A brine supply pipe 7 is connected to the evaporator through an intermediate point.

The solution to be treated, which in the embodiment shown comprises salt sea water or brine, enters the system under pressure in the pipe 8. The brine may be supplied under pressure by any suitable means such as a brine pump, commonly employed in marine installations. From the pipe 8, the brine flows through the tubes 13 of a condensate cooler 9, then through a pressure regulator 10 of known construction which maintains the brine pressure on the system constant, and through the pipe 11 to a heat exchange unit 12 which is herein termed a heat balancer. The condensate cooler 9, which is not essential to the invention in its broader aspects, may be of any conventional construction and as shown has a shell 14 surrounding the tubes 13 to carry condensate in heat exchanging relation with the incoming cold brine in the tubes.

The heat balancer 12 is also of conventional heat exchanger construction and as shown comprises a shell 14 through which vapor from the evaporator 4 passes between the duct 5 and the duct 15 over the tubes 16, suitable baffles 17 being provided to direct the vapor in a circuitous path over the tubes. Brine from the pipe 11 is conducted through the tubes 16 and then through a pipe 18, a control valve 19 and into the evaporator 4 through the pipe 7.

A separator, represented as a series of baffles 20, is provided in the upper end of the evaporator 4 to remove any entrained liquid from the vapor evolved therein and flowing out through the duct 5.

The vapor withdrawn from the heat balancer 12 through the duct 15 is compressed by suitable means and then brought into heat exchanging relation with the solution to supply heat to evaporate the same. Various means may be employed to compress the vapor. In the embodiment disclosed in Fig. 1, a steam jet evacuator or thermal compressor 21 of known construction is employed for this purpose. As shown, the intake of the evacuator is connected to the vapor duct 15, and the motive steam from a boiler or other suitable source is supplied to the jet of the evacuator through a pipe 22 under control of a valve 23. The compressed vapor and exhaust steam from the evacuator 21 is conducted by a duct 24 to the shell of a heat exchanger 25 where it flows over the tubes 26 between the baffles 27 and is condensed, the condensate being drawn off in a well 28 and a pipe 29. The pipe 29 is connected to the shell 14 of the condensate cooler 9 where the condensate flows in heat exchanging relation with the cold incoming sea water and is drawn off through the pipe 30 by a condensate removal pump 31 and delivered to a condensate storage tank, not shown. In the disclosed embodiment, the condensation of vapor and steam in the heat exchanger 25 takes place at atmospheric pressure, and accordingly an atmospheric vent 66 is connected to the shell of the evaporator 25.

In place of the steam jet evacuator or thermal-compressor 21 shown in Fig. 1, a mechanical compressor may be employed to withdraw and compress vapor from the evaporator 4 and deliver it to the heat exchanger 25. Such an arrangement has been illustrated in Fig. 3, where a compressor 90 is illustrated. The intake port 91 of this compressor may be connected to the vapor duct 15, and the outlet port 92 thereof may be connected to the pipe 24 leading to the heat exchanger 25. As shown in Fig. 3, the compressor 90 is driven by a steam turbine 93, and the exhaust steam from this turbine flows through a pipe 94 into the pipe 24. Motive steam for the turbine is supplied thereto through a pipe 95 which may be a continuation of the supply pipe 22 of Fig. 1.

The body of brine or other solution in the evaporator 4 is preferably kept relatively constant by suitable means such as a float control. As shown, a brine circulating pump 33 withdraws brine from the evaporator 4 through the pipe 6 and delivers it through a pipe 34 to the tubes 26 of the heat exchanger 25 and hence through a pipe 35 to a spray pipe 36 within the evaporator 4. The spray pipe 36 is disposed above the liquid level in the evaporator and is provided with restricted openings for permitting the solution to spray or flash within the evaporator as hereinafter explained. A float 37 acting through the levers 38 and 39 and the link 40 controls a float valve 41 in a branch pipe 42 leading from the pump outlet pipe 34. The arrangement is such that when the liquid in the evaporator 4 rises above a predetermined level, the float 37 opens the valve 41 and permits some of the brine to flow out of the system through a waste pipe 43.

Distillate from the heat balancer 12 flows through a pipe 44 which may be connected to the well 28 of the heat exchanger 25 through a U trap, as shown. The trap is employed to prevent flowing back of vapor or condensate from the heat exchanger 25 to the heat balancer 12, the heat balancer normally being at an absolute pressure considerably below that in the heat exchanger 25.

For the purpose of quickly filling the evaporator 4 and the connected liquid circuit through the heat exchanger 25 with sea water, a pipe 45, provided with a manually operable valve 46, is connected between the sea water supply pipe 8 and the brine circulating pipe 34.

In accordance with the invention, it is preferred to govern the operation of the system by varying the rate at which the solution is supplied to the evaporator 4 through the heat balancer 12, the rate of evaporation being maintained substantially constant. To this end and to obtain certain protective features, the control mechanism illustrated in Fig. 1 is provided.

The flow of sea water into the evaporator 4 through the circuit including the tubes 16 of the heat balancer 12 is governed by a throttling control valve 19 which is preferably automatically controlled in accordance with the absolute pressure at which evaporation is taking place in the evaporator 4, or in accordance with the temperature of such evaporation, which varies with such absolute pressure. As shown, the valve 19 is of the diaphragm operated type, being closed by a spring 47 and opened when pressure of a fluid in its diaphragm chamber 48 exceeds the pressure of the spring.

In the illustrated embodiment, the sea water, which is maintained under controlled pressure, is used as the valve actuating control fluid. A control fluid supply pipe 49, connnected to the sea water supply pipe 11, is connected through a needle valve 50, a relief valve 51, the pipes 52 and 53 and a needle valve 54 and the pipes 55 and 56 to the diaphragm chamber 48 of the valve 19. The valve element 57 of the relief valve 51 is normally in the lower position shown to complete the described circuit.

The liquid pressure in the diaphragm chamber 48 is controlled in accordance with the absolute pressure of evaporation by a throttling valve 58 in a waste pipe 59 connected to the pipes 55 and 56. The opening of the valve 58 is preferably automatically governed in accordance with the absolute pressure of evaporation. Pressure controlled valves of this type are well known and the construction of the valve operating mechanism will not be described in detail. As shown, a tube 60 connects the operating mechanism of the valve 58 to a suitable point in the evaporator or the ducts maintained at evaporator pressure. In the illustrated embodiment, the tube 60 runs to the duct 15 through which vapor is withdrawn from the evaporator by the evacuator 21. The arrangement is such that when the absolute pressure in the evaporator 4 increases above a predetermined value, the valve 58 is moved toward a closed position, causing an increase in the pressure of the water in the pipe 56 and the diaphragm chamber of the valve 19, thereby increasing the opening of the valve 19 and hence increasing the rate of flow of sea water through the heat balancer 12 and into the evaporator 4. If the absolute pressure in the evaporator 4 falls below a predetermined value, the valve 58 moves toward its fully opened position, permitting the flow of an increased quantity of water through the waste pipe 59 and hence reducing the pressure in the diaphragm chamber of the valve 19, whereupon the spring 47 throttles the valve 19 and the rate of flow of sea water into the evaporator 4 is reduced.

The control valve 58 may be operated directly by the absolute pressure of evaporation or indirectly in accordance with such pressure by temperature responsive means of known construction which is responsive to the temperature of the liquid or vapor in the evaporator 4. The temperature in the evaporator changes in direct proportion to the changes in absolute pressure therein, and the described control may be obtained by substituting a thermal bulb for the pressure connection so that the valve 58 will be closed by an increase in temperature and opened by a drop in temperature from a predetermined value corresponding to the desired absolute pressure of evaporation.

The motive steam supply valve 23 is of the same type as the above described sea water control valve 19, and is closed by a spring 61 and opened by fluid pressure in a diaphragm chamber 62 acting against the pressure of the spring. As shown, the diaphragm chamber 62 of the valve 23 is supplied with sea water under pressure through the pipe 63 connected to the pipe 52. A waste pipe 64 having a needle valve 65 therein is connected to the pipes 52 and 63. With this arrangement, the steam supply valve 23 is maintained open so long as the sea water in the pipes 52 and 63 is maintained under pressure. The needle valve 50 is set at a considerably larger opening than the needle valve 65, so that as long as the element 57 of the relief valve 51 is in the lower position as shown, sufficient sea water is fed to the pipes 52 and 63 to maintain a pressure that holds the steam valve 23 open despite the leakage of sea water through the needle valve 65 in the waste pipe 64. When the element 57 of the relief valve 51 rises to its upper position, the supply of sea water to the pipe 52 is cut off and the pipe 49 is vented to waste, the needle valve 50 restricting the flow to waste under this condition. Thereupon, the sea water pressure on the diaphragm chamber 62 of the steam valve 23 drops due to leakage through the needle valve 65, and the steam valve 23 closes. This drop in sea water pressure also results in closing of the valve 19.

The relief valve 51 is operated by a solenoid 67 which lowers the valve element 57 to the position shown when energized and raises this element when de-energized. The solenoid 67 is maintained energized by a circuit that is opened upon failure or improper operation of certain elements of the system, as will now be explained.

The brine circulating pump 33 is driven by a motor 68 and the condensate removal pump 31 is driven by a motor 69. The motors 68 and 69 may be polyphase inducting motors as indicated, although other type motors may be used. The motors are energized from a source represented by the terminals 70 through a manually operable main switch 71, a pressure operated switch 72 and two branch circuits respectively including overload cutout protective devices of known construction herein conventionally represented as fuses 73 and 74. The pressure operated switch 72 is of known construction and is arranged to close its contacts when a predetermined pressure is applied to its operating diaphragm chamber 75, and to open its contacts when this pressure falls below a predetermined value. The diaphragm chamber 75 is connected by a pipe 76 to the pipe 11 which normally carries sea water under controlled pressure.

The energizing circuit for the solenoid 67 of the relief valve 51 is a series circuit running from one phase lead of the brine pump motor 68 to the solenoid 67 through the wire 77, then through the wire 78 to a high level brine float switch 79 in the evaporator 4, then through the wire 80 to a high level condensate float switch 81 in the condensate well 28 and then through a wire 82 to a phase lead of the condensate removal pump motor 69 which is in a different phase of the supply circuit than the lead to which the wire 77 is connected. The switches 79 and 81 are of known construction and normally maintain the described circuit closed, but open if the liquid level in the evaporator 4 or in the condensate well 28 rises above a predetermined level. A lamp 84 or other signal may be connected between the wires 77 and 78 in parallel with the solenoid 67 to indicate operation of the system. This lamp or signal may be located at a point convenient to the operator and indicates proper operation of the system when energized.

With the arrangement described above, the solenoid 67 is maintained energized so long as the pressure of the sea water in the pipe 11 is at or above a predetermined value, the motors 68 and 69 are operating and the liquid levels in the evaporator 4 and the condensate well 28 do not exceed the desired maximum values. If the overload cutout device 73 or 74 of either of the motors 68 or 69 opens due to an obstruction in the corresponding pump or for any other cause, the solenoid 67 is de-energized. Likewise an increase in the evaporator brine level above a predetermined point opens the solenoid energizing circuit at the switch 79 and an increase in the condensate level in the well 28 breaks this circuit at the switch 81.

De-energization of the solenoid 67 raises the element 57 of the relief valve 51, cutting off the supply of sea water pressure from the pipe 52 whereupon this pressure is vented through the pipe 64 to waste, thus closing the steam supply valve 23 and the sea water control valve 19 in the manner explained above.

The operation of the embodiment of the invention illustrated in Fig. 1 will now be described. To start the operation, salt sea water or other solution is admitted to the system by opening the valve 83 in the supply pipe 8. If the evaporator 4 is empty, it can be quickly filled to the desired level by opening the valve 46 in the pipe 45 for an interval. When sufficient sea water has been admitted to the evaporator to fill it to approximately the level indicated in the drawing, the main switch 71 is closed. The pressure of the sea water in the pipe 11 closes the pressure switch 72 and the pump motors 68 and 69 start and operate the pumps 33 and 31 respectively. At the same time, the solenoid 67 is energized and the element 57 of the relief valve 51 is lowered. Sea water pressure then builds up in the diaphragm chamber 62 of the steam supply valve 23 and opens this valve which admits motive steam to the steam jet evacuator or thermal compressor 21.

The evacuator 21 quickly reduces the pressure in the evaporator 4 to or below the desired operating value, which in the disclosed embodiment is a sub-atmospheric value. At the start of the operation, substantially no evaporation takes place, and the absolute pressure in the evaporator is rapidly reduced. When the evaporator pressure is above the desired working value, the control valve 58 is closed and the sea water supply valve 19 is accordingly open, permitting sea water to flow into the evaporator 4. The excess sea water flows to waste through the pipes 42 and 43 under control of the float valve 41. As soon as the evaporator pressure is reduced as described to or below the operating value, the control valve 58 opens, releasing the sea water pressure from the operating diaphragm of the valve 19, and this valve closes.

The exhaust steam from the evacuator 21 delivers heat to the brine through the heat exchanger 25, and since this brine is continuously circulated through the tubes 26 of the heat exchanger, the body of brine in the evaporator 4 and in the heat exchanger 25 is heated up. The exhaust steam is condensed by this heat exchange and the condensate flows into the well 28. When the temperature of the brine in the evaporator 4 rises to a value near the working value, evaporation of water from the brine takes place in the evaporator. The capacity of the pump 33 is so related to the size of the openings in the spray pipe 36 that the brine is kept under sufficient pressure in the heat exchanger tubes 26 to prevent its ebullition therein at the working temperature. When the brine temperature is at or near the working temperature, the reduction of the pressure thereon upon passing through the spray pipe openings and into the evaporator causes a part of the water in the brine to flash or vaporize, the more concentrated brine falling into the body of brine in the evaporator.

The described heating up of the brine continues until the brine temperature and the absolute pressure in the evaporator reach the working values. Thereafter, vapor is evolved in the evaporator at a rate somewhat greater than the rate at which vapor is withdrawn therefrom and compressed by the evacuator 21. Thus the absolute pressure in the evaporator 4 tends to rise. Any increase in absolute pressure in the evaporator above a predetermined value moves the control valve 58 toward its closed position, increasing the sea water pressure on the diaphragm chamber 48 of the sea water control valve 19 and so opening this valve. Relatively cold sea water then flows from the pipe 11, through the tubes 16 of the heat balancer 12, through the pipes 18 and 7 and into the evaporator 4. All of the vapor evolved in the evaporator 4 is drawn through the shell of the heat balancer 12 by the evacuator 21, and the flow of sea water through the heat balancer tubes 16 causes condensation of some of the evolved vapor within the heat balancer shell, the resulting distillate flowing through the trapped pipe 44 to the condensate well 28. This condensation of a part of the uncompressed vapor reduces the absolute pressure in the evaporator, and when the desired working pressure is restored, the control valve 58 moves toward its open position and the sea water control valve 19 moves toward its closed position until the opening of the valve 19 is such that the system is balanced, that is, evaporation takes place at a substantially constant temperature and pressure with a continuous flow of sea water into the evaporator and discharge of sea water from the system through the pipe 43. The continuous feed of sea water and discharge of concentrated brine prevents the accumulation of salt or other solute in the evaporator or in other parts of the system.

The described arrangement in which all of the vapor evolved in the evaporator 4 is drawn through the heat balancer 12 by the evacuator 21, prevents the accumulation of air in the heat balancer. Air and other non-condensible gas is introduced into the evaporator as entrained air, as dissolved air in the water, and through air leaks, particularly where as in the present system the evaporator operates at sub-atmospheric pressure. The accumulation of air in a condenser or heat exchanger lowers the heat transmission efficiency of its heat exchanging surfaces. In the present system, the vapor evolved in the evaporator entrains any air that may be present and carries it through the heat balancer 12 and the evacuator 21 and finally into the heat exchanger 25 from which the air escapes to atmosphere through the vent 66. The accumulation of air in the system is thus prevented without the necessity for using an air withdrawal pump or purger.

The distillate from the heat balancer 12 and condensate from the heat exchanger 25 collect in the well 28 and are drawn off as the total condensate produced through the pipe 29 and the tubes 13 of the condensate cooler 9 by the pump 31 which delivers the condensate to storage. Some of the sensible heat in the condensate is recovered and delivered to the incoming sea water by exchange in the condensate cooler 9. The condensate cooler is not essential to the invention and may be omitted. If desired, the distillate from the heat balancer 12 may be drawn off separately and used for drinking purposes, since this distillate is not condensed from boiler steam and is free from any oil or other impurities that may be present in steam from a boiler.

It should be noted that in the above described operation of my system, the steam supply and the rate of evaporation are kept substantially constant and the only variable control is the corrective variation of the rate of flow of sea water to the evaporator and out of the system. This corrective control is governed by departures of the absolute pressure in the evaporator, or, what is the same thing, in the vapor intake of the steam jet evacuator, from the desired working value.

Heat is supplied to the system by the motive steam and in the form of the sensible heat in the sea water. The heat supplied by the motive steam acts in part to compress the vapor withdrawn from the evaporator 4 by the evacuator 21, and the heat of the compressed vapor and of the exhaust steam is delivered to the brine in the evaporator through the heat exchanger 25. The heat so delivered includes the latent heat of vaporization of the vapor and steam and some vapor heat of the compressed vapor and sensible heat of condensate, the remainder appearing as sensible heat in condensate that is drawn off through the pipe 29. The heat transferred to the brine by condensation of the compressed vapor and exhaust steam is in excess of that required to evaporate vapor at the rate that vapor is withdrawn from the evaporator 4 by the evacuator 21, and the excess vapor is condensed in the heat balancer 12. In a typical installation, about 75% of the vapor evolved is withdrawn and compressed by the evacuator 21, and the remaining 25% is condensed in the heat balancer 12.

The heat supplied to the system acts to increase the sensible heat of the sea water to the boiling point at the controlled evaporation pressure and to supply the latent heat of vaporization to maintain evaporation, and the excess heat over that so employed passes off in the concentrated brine that is pumped overboard and in the condensate from the heat balancer 12 and the heat exchanger 25. Some additional heat is lost by radiation from the apparatus, but this loss may be kept very low by proper insulation.

If the temperature of the sea water or other solution treated rises, the absolute pressure of evaporation tends to increase with a resultant increase in the opening of the sea water control valve 19, and the rate of flow of sea water into the evaporator 4 through the tubes of the heat balancer 12 increases. This restores the desired rate of condensation in the heat balancer and maintains the absolute pressure of the evaporator at the desired value with an increase rate of flow of sea water to the evaporator and an increased rate of discharge of brine from the system. The amount of heat loss from the system does not change appreciably with the increased rate of brine discharge because the difference in temperature between the incoming sea water and the discharged brine drops. This necessarily results since evaporation takes place at a substantially constant temperature, and any increase in the temperature of the incoming sea water necessarily reduces this temperature difference. Since less sensible heat is added to bring the sea water to the boiling point at the fixed evaporating pressure, a slightly increased amount of heat is removed in the discharged brine to maintain the heat balance of the system.

A drop in temperature of the incoming sea water has the reverse effect. It results in temporarily increasing the rate of condensation of vapor in the heat balancer 12 which tends to reduce the absolute pressure in the evaporator 4. This results in a reduction in the opening of the sea water control valve 19 and a consequence reduction in the rate of supply of sea water to the evaporator. This in turn reduces the rate of condensation in the heat balancer 12 to the desired value and restores the desired evaporation pressure. The rate of brine discharge falls with the reduced sea water input and the system continues to operate in balance with constant evaporation and condensate production at a reduced rate of throughput of brine. The amount of heat lost in the discharged brine is slightly reduced since a slightly increased amount of heat is required to heat the cooler sea water up to the substantially fixed evaporation temperature.

The system is so designed as to operate automatically in the manner described over the range of input sea water or other solution temperatures that are met with in practice. The normal operation of the system is automatic and self controlled and changes in the input solution temperature are automatically compensated for by changes in the rate of solution throughput. Since the absolute pressure at which evaporation takes place and thus the suction pressure on the evacuator 21 is maintained substantially constant, the evacuator may be operated in a highly efficient and economical manner.

When a mechanical compressor such as the device 91 of Fig. 3 is substituted for the steam jet evacuator 21, the operation of the system is unchanged. The exhaust steam from the compressor driving turbine 93 is mixed with the compressed vapor in the pipe 24' and delivered therewith to the heat exchanger 25. The steam supplied to operate the turbine 93 through the pipe 95 is controlled by the steam control valve 23 in the manner explained above in connection with the evacuator 21.

The above described protective devices prevent flooding of the system or injury thereto in case of failure of electric power or of the pumping equipment, clogging of pipes or failure of the sea water supply. If the electric power fails, the pump motors 68 and 69 stop and the solenoid 67 is deenergized, bleeding off the control pressure from the pipes 52, 53, 63, 55 and 56 and so closing the steam supply valve 23 and the sea water inlet valve 19. Overloading of either pump motor has the same effect since when either of the motor overload protective devices 73 or 74 opens, the solenoid 67 is de-energized. Similarly, a drop in supply sea water pressure due to any failure in the pumping equipment or the supply ducts opens the pressure switch 72 and de-energizes the solenoid 67. In each of the above cases, the hot brine is retained in the evaporator 4 and undue heat loss from the system by discharge of the brine is avoided. Failure of the condensate or brine pumps 31 or 33 to remove the condensate or brine which might result from clogging of the pipes leading to or from these pumps increases the level of condensate in the well 28 or of brine in the evaporator 4. This opens the float switches 81 or 79, and in either case the energizing circuit for the solenoid 67 is opened with the result that the steam and sea water supply valves 23 and 19 are closed. In such a case, the pumps 31 and 33 continue to operate unless they are stopped by an overload or a failure of supply sea water pressure. Any failure results in de-energization of the solenoid 67 and the accompanying de-energization of the signal device 84 informs the operator or supervisor of the shutdown.

The system disclosed in Fig. 2 differs from that of Fig. 1 in that heat from the compressed vapor and exhaust steam is transferred to the brine within the evaporator directly through a tube bundle and causes ebullition and vaporization of the brine directly from the body of brine in the evaporator rather than by spray flashing. Many of the devices employed in the two systems are identical, and the description of such parts will not be repeated. Parts of the system of Fig. 2 which correspond to previously described parts of the system of Fig. 1 will be designated by like reference characters with distinctive exponents.

The evaporator 4' is provided with a tube bundle 100 disposed therein at such a position that the greater part of the tube bundle is submerged when the brine level in the evaporator is at or near the desired point illustrated. As shown, the tube bundle 100 may extend laterally into the evaporator 4' adjacent the lower end of the evaporator. The tube sheet 101 of the bundle 100 is suitably secured to the shell of the evaporator 4' about an opening therein through which the tube bundle 100 extends, and a head or manifold 102 secured over the tube sheet 101 directs compressed vapor and exhaust steam from the evacuator 21' and duct 24' through the tubes of the bundle. The head 102 and the tubes connected thereto are vented to atmosphere by a pipe 103. Condensate from the tube bundle 100 collects in the well 28', and the distillate discharge pipe 44' from the shell 14' of the heat balancer 12' is also connected to the well 28', a trap being provided in the pipe 44' to prevent reverse flow of condensate due to the pressure difference between the tube bundle 100 and the heat balancer 12'.

Brine is removed from the evaporator 4' by a pump 33' connected by a pipe 6' with the lower end of the evaporator. The discharged brine flows overboard or to waste through a pipe 43' under control of a valve 41' controlled by a float 37' to maintain a substantially constant liquid level in the evaporator 4'.

Condensate and distillate from the well 28' is drawn off by the condensate pump 31' through the pipe 29', the shell 14' of the condensate cooler 9' and the pipe 30', and the condensate is delivered to the storage tank, not shown. The remainder of the apparatus comprising the system of Fig. 2 is in all respects the same as that of Fig. 1. It should be understood that in the system of Fig. 2, a steam driven mechanical compressor such as the compressor 91 of Fig. 3 may be substituted for the steam jet evacuator 21' in the same manner as has been explained above in connection with the system of Fig. 1.

The operation of the system of Fig. 2 is substantially the same as that described above in connection with the system of Fig. 1. The evaporator 4 is filled with solution to substantially the indicated level, the valve 46' in the pipe 45' being opened for this purpose. With the valve 83' in the pipe 8' open, the switch 71' is closed, and sea water pressure in the pipe 11' closes the pressure switch 72', starting the pump motors 68' and 69' and energizing the solenoid 67' to lower the element 57' and so close the waste pipe 50 of the relief valve 51'. The steam valve 23' then opens, starting the evacuator 21' and lowering the pressure in the evaporator 4'. Before the absolute pressure in the evaporator is lowered to the desired working value, the sea water supply valve 19' is open, but the liquid level in the evaporator is maintained constant by removal of liquid therefrom by the pump 33' under control of the float valve 41'. The exhaust steam from the evacuator 21' flows through the pipe 24' and the tubes of the bundle 100, heating up the brine in the evaporator 4' and condensing the steam. When the brine is heated to the boiling point at the absolute pressure of the evaporator 4', evaporation takes place and the evolved vapor is withdrawn through the separator illustrated as the baffles 20', the duct 5', the shell 14' of the heat balancer 12', and the duct 15'. The withdrawn vapor is compressed up to atmospheric pressure in the evacuator 21' and delivered through the pipe 24'. The compressed vapor and exhaust steam are condensed in the tube bundle 100 and the condensate collects in the well 28' and is drawn off by the pump 31'. Distillate from the heat balancer 12' flows into the well 28' through the pipe 44' and is drawn off with the condensate. The distillate may be drawn off separately for use as drinking water if desired.

The system of Fig. 2 is so controlled as to maintain a substantially constant absolute pressure in the evaporator 4', and this pressure is so chosen as to insure economical and efficient operation of the evacuator 21'. The amount of heat delivered to the brine in the evaporator 4' by condensation from the compressed vapor and exhaust steam in the tube bundle 100 is in excess of that required to evolve vapor at the rate vapor is withdrawn by the evacuator 21', and the excess is condensed in the heat balancer 12'. At the operating evaporation pressure, the sea water supply valve 19' is partly open so that there is a constant input and withdrawal of brine through the evaporator. Increases in absolute pressure in the evaporator 4' above the desired working value are compensated for by increases in the rate of flow of sea water through the tubes 16' of the heat balancer 12', the opening of the sea water control valve 19' being increased by the action of the control valve 58' which responds to the changes in absolute pressure in the duct 15' or to changes in temperature in the evaporator which correspond to such absolute pressure changes. A rise in incoming sea water temperature tends to increase the pressure in the evaporator 4' and results in an increase in the rate of sea water input. Conversely, a drop in incoming sea water temperature results in a decrease in sea water input, and the pressure and rate of evaporation in the evaporator 4' are maintained substantially constant. Any air that may be present in the evaporator 4' is removed therefrom and from the heat balancer 12' by the vapor which passes in series through the evaporator and heat balancer, and this air escapes to atmosphere through the vent 103.

The system of Fig. 2 is protected against failure of electric power, overloading of the pump motors 68' or 69', clogging of the condensate or brine removal pumps or ducts and failure of sea water supply pressure in the same manner as has been described in connection with the system of Fig. 1. Failure of supply sea water pressure or electric power, overload de-energization of either of the pump motors 68' or 69' or rise in the liquid level in the evaporator 4' or the condensate well 28' de-energizes the solenoid 67' and lifts the element 57' of the relief valve 51', venting the control sea water and closing the steam supply valve 23' and the sea water supply valve 19'. De-energization of the solenoid 67' is accompanied by de-energization of the signal device 84' whereby the operator is informed of the failure or shutdown.

From the foregoing, it will be apparent that the evaporation system and method of my invention present many advantageous features. Once started up, the system operates automatically and continuously over long periods without attention. Evaporation and condensation proceed at a substantially constant rate despite changes in the temperature of the incoming sea water, and such changes do not materially affect the operating efficiency of the system. The throughput of sea water insures the removal of salt or other solute from the evaporator, and shutdowns for removing solute accumulations are avoided. The system is protected against failures of power or solution supply, clogging or overloading such as may occur in practice. The design of the system is such that it may be economically constructed and arranged in a very compact form. Since the system is at all times maintained in a balanced condition with respect to heat input and dissipation, the suction pressure on the evacuator or other compressor is maintained constant, and this pressure can be so chosen as to insure efficient operation of the vapor compressing mechanism.

Although my invention has been described in connection with an evaporation system designed primarily for treating sea water to obtain fresh water in marine installations, it should be understood that the invention is not limited to such applications. It can be used to concentrate solutions or to remove liquids from solutions whenever such operations are desired in the industrial and chemical field generally. The temperature and absolute pressure of evaporation and disposal of the concentrated solution and the condensate and distillate can be varied to suit the particular application and the results to be accomplished.

I claim:

1. Evaporation apparatus comprising an evaporator for enclosing a solution to be evaporated, a compressor connected to withdraw vapor from said evaporator and compress the same, means for conducting said vapor from said compressor into heat exchanging relation with the solution in said evaporator, means for supplying solution to said evaporator, means for withdrawing solution from said evaporator, means responsive to the liquid level of solution in said evaporator for controlling the operation of said withdrawal means whereby the solution in said evaporator is maintained at a predetermined level, means for conducting the supplied solution in heat exchanging relation with the vapor being withdrawn from the evaporator whereby a part of said vapor is condensed, and means responsive to an increase in the liquid level of solution in said evaporator above said predetermined level for stopping said solution supply and withdrawal means and said compressor.

2. Evaporation apparatus comprising an evaporator for enclosing a solution to be evaporated, a compressor connected to withdraw vapor from said evaporator and compress the same, means for conducting said vapor from said compressor into heat exchanging relation with the solution in said evaporator, means for supplying solution to said evaporator, means for withdrawing solution from said evaporator, means responsive to the liquid level of solution in said evaporator for controlling the operation of said withdrawal means whereby the solution in said evaporator is maintained at a predetermined level, means for conducting the supplied solution in heat exchanging relation with the vapor being withdrawn from the evaporator whereby a part of said vapor is condensed, means responsive to the absolute pressure of the vapor in said evaporator for variably controlling the rate at which solution is supplied to said evaporator, and means responsive to an increase in the liquid level of solution in said evaporator above said predetermined level for stopping said solution supply and withdrawal means and said compressor.

3. Evaporation apparatus comprising an evaporator for enclosing a solution to be evaporated, means for supplying a solution to said evaporator, a compressor connected to withdraw vapor from said evaporator, heat exchange means for conducting compressed vapor from said compressor into heat exchanging relation with the solution in said evaporator, a pump for withdrawing solution from said evaporator, means responsive to the liquid level in said evaporator for controlling the rate at which solution is withdrawn by said pump whereby the amount of solution in said evaporator is maintained substantially constant at a predetermined value, and means responsive to a rise in the level of solution in said evaporator above said predetermined value for stopping said pump, discontinuing the supply of solution to said evaporator and stopping said compressor.

4. Evaporation apparatus comprising an evaporator for enclosing a solution to be evaporated, means for supplying a solution to said evaporator, a compressor connected to withdraw vapor from said evaporator, heat exchange means for conducting compressed vapor from said compressor into heat exchanging relation with the solution in said evaporator, whereby heat is supplied to evaporate solution in said evaporator and said compressed vapor is condensed, a pump for withdrawing condensate from said heat exchange means, a second pump for withdrawing solution from said evaporator, means responsive to the liquid level in said evaporator for controlling the rate at which solution is withdrawn by said second pump whereby the level of solution in said evaporator is maintained substantially constant at a predetermined value, means for driving each of said pumps and means responsive to stoppage of either of said pump driving means for discontinuing the supply of solution to said evaporator and stopping said compressor.

5. Evaporation apparatus comprising an evaporator for enclosing a solution to be evaporated, means for supplying a solution to said evaporator, a compressor connected to withdraw vapor from said evaporator, heat exchange means for conducting compressed vapor from said compressor into heat exchanging relation with the solution in said evaporator, whereby heat is supplied to evaporate solution in said evaporator and said compressed vapor is condensed, a pump for withdrawing condensate from said heat exchange means, a second pump for withdrawing solution from said evaporator, means responsive to the liquid level in said evaporator for controlling the rate at which solution is withdrawn by said second pump whereby the level of solution in said evaporator is maintained substantially constant at a predetermined value, means for driving each of said pumps and means responsive to a stoppage of either of said pump driving means and to a rise in the level of solution in said evaporator above said predetermined value for discontinuing the supply of solution to said evaporator and stopping said compressor.

6. Evaporation apparatus comprising an evaporator for enclosing a solution to be evaporated, a source of solution under pressure, means for supplying solution from said source to said evaporator, a compressor for withdrawing vapor from said evaporator, heat exchange means for conducting vapor from said compressor into heat exchanging relation with the solution in said evaporator whereby heat is supplied to evaporate solution in said evaporator and said compressed vapor is condensed, a pump for withdrawing condensate from said heat exchanger, a second pump for withdrawing solution from said evaporator, means for operating said pumps, and means responsive to a decrease in the pressure of the solution from said source below a predetermined value for stopping said pump operating means, discontinuing the supply of solution to said evaporator and stopping said compressor.

7. Evaporation apparatus comprising an evaporator for enclosing a solution to be evaporated, means for supplying solution to said evaporator, a compressor for withdrawing vapor from said evaporator, heat exchange means for conducting compressed vapor from said compressor into heat exchanging relation with the solution in said evaporator whereby heat is supplied to evaporate solution in said evaporator and said compressed vapor is condensed, a pump for withdrawing condensate from said heat exchanger, a second pump for withdrawing solution from said evaporator, electric motors for respectively operating said pumps, means for de-energizing said respective motors upon overloading thereof and means responsive to the de-energizing of either of said motors for discontinuing the supply of solution to said evaporator and stopping said compressor.

JOHN KIRGAN.

REFERENCES CITED

The following references are of record in the file of this patent:

UNITED STATES PATENTS

| Number | Name | Date |
|---|---|---|
| Re. 21,129 | Fox | June 27, 1939 |
| 79,260 | Savalle | June 23, 1868 |
| 760,440 | Forbes | May 24, 1904 |
| 838,195 | LeSueur | Dec. 11, 1906 |
| 1,213,596 | DeBaufre | Jan. 23, 1917 |
| 1,252,962 | Soderlund | Jan. 8, 1918 |
| 1,361,834 | DeBaufre | Dec. 14, 1920 |
| 2,386,778 | Claffey | Oct. 16, 1945 |

FOREIGN PATENTS

| Number | Country | Date |
|---|---|---|
| 117,806 | Australia | Dec. 9, 1943 |
| 16,035 | Great Britain | 1897 |

OTHER REFERENCES

Technical Manual 5-2068, U. S. Army Corps of Engineers, Jan. 1945, pages 8, 13, 14. Copy in Division 25.